Patented Dec. 11, 1923.                                               1,476,873

UNITED STATES PATENT OFFICE.

GEORGE B. BURNHAM, OF GLENDALE, CALIFORNIA.

PROCESS OF RECOVERING VALUABLE COMPONENTS FROM A COMPLEX LIQUID PHASE.

No Drawing.      Application filed November 3, 1919.   Serial No. 335,493.

*To all whom it may concern:*

Be it known that I, GEORGE B. BURNHAM, a citizen of the United States, residing at Glendale, in the county of Los Angeles, State of California, have invented a certain new and useful Process of Recovering Valuable Components From a Complex Liquid Phase, of which the following is a specification.

This application is a continuation in part of application Serial Number 307,751, filed in the Patent Office on June 30, 1919.

This invention relates to a process of separately recovering at least one of the components from a liquid phase containing at least three components, and is particularly applicable to the recovery of one or more salts from liquids depositing two or more salts in the same container.

An object of the invention is to provide a cheap process for recovering the valuable components from liquid phases containing three or more components.

The invention possesses other advantageous features, some of which, with the foregoing, will be set forth in the following description, where I shall outline in full one form of the process of my invention. I shall describe the process as applied to an aqueous solution of salts, such as Searles Lake brine, in California, but it is to be understood that the process is not limited to this particular liquid. Searles Lake brine contains sodium, potassium, chloride, sulfate, carbonate, and borate ions.

I prefer to make use of natural evaporation and natural temperatures, but artificial evaporation and artificial temperatures may also be employed.

Hitherto, various salts have usually been recovered from saline liquors by crystallizing out each salt in a separate container. In accordance with my process, however, I allow two or more of the salts to crystallize out in the same container and then separate the two salts by mechanical means. In order that the mechanical separation may be accomplished with ease, I make use of the effect that supersaturation has on the time of deposition of the salts and also the physical characteristics of the individual salts such as size and shape of crystals, specific gravity, or other physical properties.

In the preferred form of my process as applied to Searles Lake brine, it is desired that the liquor shall crystallize out two or more salts in the same container. This can be accomplished during evaporation, or, during cooling. It is also preferred that one or more of the deposited salts shall be valuable. One method of accomplishing this with Searles Lake brine during an evaporation state is as follows:

The brine is pumped into solar ponds to evaporate in the warmest part of summer. The brine is flowed into shallow ponds in the morning to evaporate during the heat of the day and flowed into deep ponds in the evening to retain its warm temperature during the night. The next morning the brine is again flowed out into shallow ponds to evaporate during the day and again flowed into deep ponds at night. In this way the brine continues to evaporate at the relatively warm temperature of daytime and sodium chloride and sodium carbonate sulfate crystallize out. Evaporation is continued in this manner until the brine becomes saturated with potassium sodium sulfate, which is a valuable salt, and is the principal salt sought under these conditions. The brine is now saturated with sodium chloride and potassium sodium sulfate and is transferred to another pond and the sodium chloride and potassium sodium sulfate are allowed to crystallize out together. The individual crystals that are deposited are, to a large extent, formed separate from each other, while others are slightly stuck together. The mixed crystals of sodium chloride and potassium sodium sulfate are then gathered and gently crushed, thereby more completely separating the crystals. The potassium sodium sulfate crystals are very fine while the sodium chloride crystals are relatively large and the two salts are, therefore, readily separated from each other by mechanical means.

The method of performing my process with Searles Lake brine during a cooling stage is as follows:

The above brine is allowed to continue evaporation depositing sodium chloride and potassium sodium sulfate until it becomes saturated, or approximately saturated, with potassium chloride, borax and a carbonate salt. The latter salt may be sodium carbonate or may be trona. The amount of evaporation is controlled by the depth of the brine in the pond so that saturation with the above salts will be obtained at about the beginning of fall.

The brine is then preferably placed in a very deep pond to a depth of ten or twenty feet, or more. This transferring of the brine to another pond is not absolutely necessary to the process, but it is of advantage in obtaining thick deposits of salts on the bottom of the pond, as will be shown later.

It will be noted that this brine has become approximately saturated with three types of salts, which, upon cooling, will be crystallized out, namely, potassium chloride, borax and sodium carbonate, the solubility of which is greatly affected by temperature changes. All these salts are especially valuable and their recovery is desirable.

Having thus brought the brine to this condition, my process proceeds as follows:

The brine is allowed to cool during the fall, whereupon a state of supersaturation with these salts will exist. It is desired to let this condition of supersaturation be as great as is possible. As the brine continues to cool, it becomes more and more supersaturated, and this condition of unstable equilibrium after a time becomes too great for one of the supersaturated salts, whereupon it begins to rapidly crystallize out. Potassium chloride may be the first salt to crystallize out, or sometimes, under other conditions, the carbonate or borax may appear first. As the brine is very deep, a large quantity of brine is held over each unit area of bottom surface. The supersaturated salt which settles to the bottom will, therefore, be several inches thick.

As the brine continues to cool, another one of the supersaturated salts will suddenly begin to crystallize out. If this salt happens to be sodium carbonate, a thick layer of sodium carbonate will form at the bottom of the pond on top of the previously deposited salt.

The same happens with the borax. Sudden crystallization from a state of supersaturation will form a thick layer of the borax at the bottom of the pond and on top of the previous deposits.

At the end of fall, or in winter, when the brine has cooled sufficiently, it is removed from the deposited salts. The layers of different salts can be readily differentiated from each other and thus are capable of easy separation with a shovel or by other mechanical means.

These salts that crystallize out may be supersaturated more than once during cooling in the fall. Hence there may be more than one layer of the same salt deposited, but where the brine is deep, these layers are always thick enough to be separated with a hand shovel. However, the greater the amount of supersaturation, the thicker will be the layers and, consequently, there will be fewer layers of the same salt. For this reason anything that will increase the amount of supersaturation is desirable.

The tendency toward supersatuaration is increased by the addition of a little water to the surface of the pond. The water being lighter than the brine will spread out and lie on top of the surface. This water tends to prevent the formation of crystals on the surface and especially around the edges of the pond where chilling is greatest. Thus, premature inocculation of the supersaturated brine with crystals of the supersaturated salt is prevented. The water has also an advantage in compensating for the natural evaporation that would otherwise occur in the pond during the fall cooling. The water added to the surface of the brine gradually diffuses in time through the brine and enough water can be added, if desired, to provide for water of crystallization in the supersaturated salts. By adding enough water to provide for water of crystallization as well as evaporation, there will be no sodium chloride deposited. The solubility of sodium chloride is not appreciably affected by cooling, and will not crystallize out so long as the water content in the brine remains practically the same.

It is to be understood that the addition of the water to the pond is not absolutely necessary for the supersaturation occurs just the same without it, but the amount of supersaturation is usually greater if the water is added, and it also has the beneficial effect of preventing the crystallization of sodium chloride.

It is also to be understood that the deposit of salts that separate out on cooling may, if desired, be separated by other mechanical means. That is, the mass of various salts may be gathered up and gently crushed to separate the individual crystals, the different salts may then be separated by making use of their size, shape, specific gravity, or other physical characteristics.

Other methods of mechanical separation may be advantageously employed. The crystals deposited in the pond may be removed with a hydraulic dredge, floating on the pond, which discharges the raised crystals and liquor into a long, narrow pond, in which the coarser salts settle quickly adjacent the end of the discharge pipe and the fine-grained crystals float away and settle at points remote from the discharge pipe. In another method, the pumped mixture of brine and crystals is flowed through a trough having a perforated bottom and submerged in a vat or pond of brine. The coarser salts pass through the holes in the bottom of the trough and the fine crystals are carried along in the brine stream and discharged from the end of the trough into a settling pond.

I claim:

1. The process of recovering at least one component from a liquid phase containing at least three components which consists in bringing the liquid phase to supersaturation and causing the supersaturated liquid phase to deposit at least two solid phases in the same container and separately recovering at least one of the solid phases.

2. The process of recovering salts from liquors containing more than one salt which consists in evaporating the liquor to deposit one salt and creating a state of supersaturation with a second salt whereby the second salt is deposited in a layer separate from the first salt and mechanically separating at least one of the deposited salts.

3. The process of recovering borax from liquors containing sodium, potassium, chloride, sulphate, carbonate and borate ions, comprising evaporating the liquor to increase the concentration of the salts, cooling the liquor to crystallize out borax and other salts, and mechanically separating the borax from the other deposited salts.

4. The process of recovering salts from liquors containing more than one salt which consists in bringing the liquor to supersaturation, causing the supersaturated liquor to deposit salts in layers in the same container and mechanically separating and recovering at least one of the deposited salts.

5. The process of recovering salts from liquors containing more than one salt which consists in bringing the liquor to supersaturation with one salt, causing said salt to deposit and creating a state of supersaturation with a second salt and causing the second salt to deposit in a layer separate from the first salt and separating and recovering at least one of the deposited salts.

6. The process of recovering borax from a liquor containing borax and other salts, which consists in causing the liquor to deposit other salts while maintaining a state of supersaturation with the borax, allowing the supersaturated borax to be crystallized out on top of the other salts, removing the liquor from the deposited salts and recovering the borax.

7. The process of recovering borax from liquors containing borax and other salts, which consists in causing the liquor to deposit borax and other salts in the same container and mechanically separating the borax from the other salts.

8. The process of recovering salts from liquors containing various salts, comprising evaporating and cooling the liquor to deposit salts from saturated and supersaturated liquor in such a manner as to form layers of salts in the same container and separating the layers of salts.

9. The process of recovering salts from an aqueous liquor saturated with at least two salts, which consist in cooling the liquor to form a state of supersaturation with the salts, adding water to the surface of the liquor to prevent the formation of surface crystals and increase the state of supersaturation by preventing inoculation with surface crystals, continuing cooling until one after another of the supersaturated salts crystallize out and recovering the layers of salts thus deposited.

10. The process of recovering salts from liquors saturated with at least two salts, which consists in cooling the liquor to deposit one salt while maintaining a state of supersaturation with a second salt, continuing cooling and allowing the second salt to become as supersaturated as possible, causing the second salt to rapidly deposit on top of the first salt and recovering the layers of deposited salts so formed.

11. The process of recovering salts from liquors saturated with at least two salts, which consists in cooling the liquor to deposit one salt, maintaining a state of supersaturation with a second salt, adding water to the liquor, continuing cooling until the second salt can no longer hold its state of supersaturation, allowing the second salt to deposit on top of the first salt and recovering the deposited salts.

12. The process of recovering salts from liquors from Searles Lake, comprising evaporating and cooling the liquor to deposit salts from saturated and supersaturated liquors so as to form layers of salts in the same container and recovering the valuable salts.

13. The process of recovering salts from saturated liquors from the Searles Lake, comprising cooling the liquor in the fall in a deep pond exposed to the atmosphere to cause the salts to become supersaturated, adding sufficient water to the surface of the deep pond to prevent concentration of the exposed liquor and to retard inoculation of the supersaturated liquor by the formation of surface crystals, continuing exposure until salts from the supersaturated liquor are deposited one after another in layers, removing the liquor from the deposited salt layers and recovering the valuable salts.

14. The process of recovering at least one component from a liquid phase containing at least three components, which consists in causing a state of supersaturation in the liquid phase and causing the liquid phase to deposit at different intervals of time the solid phases held in the state of supersaturation, removing the liquid phase from the solid phases and separately recovering the deposited solid phases.

In testimony whereof, I have hereunto set my hand at San Francisco, California, this 22nd day of October, 1919.

GEORGE B. BURNHAM.

In presence of:—
H. G. PROST.